United States Patent
Kasirajan

(10) Patent No.: US 12,496,183 B2
(45) Date of Patent: Dec. 16, 2025

(54) SYSTEM, METHOD AND TREATMENT OF ANEURYSMS UTILIZING ENDOGRAPHS

(71) Applicant: Karthikeshwar Kasirajan, Danville, CA (US)

(72) Inventor: Karthikeshwar Kasirajan, Danville, CA (US)

( * ) Notice: Subject to any disclaimer, the term of this patent is extended or adjusted under 35 U.S.C. 154(b) by 504 days.

(21) Appl. No.: 18/194,015

(22) Filed: Mar. 31, 2023

(65) Prior Publication Data

US 2024/0325137 A1    Oct. 3, 2024

(51) Int. Cl.

| | |
|---|---|
| A61B 17/00 | (2006.01) |
| A61B 18/20 | (2006.01) |
| A61F 2/04 | (2013.01) |
| A61F 2/07 | (2013.01) |
| A61F 2/82 | (2013.01) |
| A61B 18/00 | (2006.01) |

(52) U.S. Cl.
CPC ............... *A61F 2/07* (2013.01); *A61B 18/20* (2013.01); *A61B 2018/00577* (2013.01)

(58) Field of Classification Search
None
See application file for complete search history.

(56) References Cited

U.S. PATENT DOCUMENTS

| | | |
|---|---|---|
| 6,673,104 B2 | 1/2004 | Barry |
| 8,398,703 B2 | 3/2013 | Kassab et al. |
| 8,465,453 B2 * | 6/2013 | Sandhu ............... A61F 2/958 |
| | | 604/102.03 |
| 8,532,743 B2 | 9/2013 | Stangenes et al. |
| 9,468,516 B2 * | 10/2016 | Sandhu ................. A61F 2/07 |
| 9,706,998 B2 * | 7/2017 | Dickinson ............ A61F 2/844 |
| 10,849,774 B2 | 12/2020 | Chobotov |
| 10,952,884 B2 | 3/2021 | Shalev |
| 11,826,504 B2 * | 11/2023 | Lenihan ........... A61B 17/12186 |
| 11,850,379 B2 * | 12/2023 | Humbert .......... A61B 17/12186 |
| 2004/0059280 A1 * | 3/2004 | Makower ......... A61B 17/12136 |
| | | 606/108 |
| 2005/0090843 A1 | 4/2005 | Bolduc |
| 2005/0187541 A1 * | 8/2005 | Maschke ............... A61B 18/24 |
| | | 606/15 |
| 2010/0106175 A1 * | 4/2010 | McLachlan ............. A61F 2/06 |
| | | 606/185 |
| 2010/0286791 A1 * | 11/2010 | Goldsmith ....... A61B 17/12022 |
| | | 604/524 |
| 2021/0052363 A1 * | 2/2021 | Tillman ................... A61F 2/07 |
| 2021/0052854 A1 * | 2/2021 | Tavallaei .......... A61M 25/0147 |
| 2024/0033027 A1 * | 2/2024 | Perkins ................. A61B 34/73 |

FOREIGN PATENT DOCUMENTS

| | | | | |
|---|---|---|---|---|
| WO | WO-2009056644 A1 * | 5/2009 | ............. | A61F 2/954 |
| WO | WO-2022093840 A1 * | 5/2022 | ............. | A61B 18/14 |

* cited by examiner

*Primary Examiner* — Ann Hu
(74) *Attorney, Agent, or Firm* — Harpman & Harpman

(57) ABSTRACT

A system and method of remote guidance and alignment for endovascular fenestration of a vascular prothesis placed intraluminally that includes a flexible magnetic guide sheath having a magnetic distal end. An implantable magnetic stent for intraluminal placement in proximal end of a target artery providing magnetic guidance outside the endovascular aortic stent graft prothesis for accurate aperture formation in the vascular prothesis for subsequent placement of covered branch stents thereto.

1 Claim, 3 Drawing Sheets

SYSTEM, METHOD AND TREATMENT OF ANEURYSMS UTILIZING ENDOGRAPHS

BACKGROUND OF THE INVENTION

1. Technical Field

This invention relates to implantable medical devices specifically vascular prosthesis in endovascular aneurysm repair applications.

2. Description of Prior Art

Aneurysms of the aorta occurring in the abdominal region are repaired by placement of a prosthetic graft typically made from woven tubes of suitable synthetic materials. The technique of endovascular repair is when the aneurysm is bridged with vascular endograft which is placed intraluminally. A number of prior art patents disclose a variety of catheter-based implantation apparatus and methods directed to securing an endovascular prothesis, see U.S. Patent Publication 2005/0090843 that uses attached elements implanted in the vessel wall.

A stent graft delivery system access conduit can be seen in U.S. Pat. No. 10,849,774 that provides a delivery system with integral aneurysm sac conduit for introducing material for treating endoleaks.

A multi-fabric endovascular stent graph is claimed in U.S. Pat. No. 10,952,884 which includes a flexible stent member and a tubular fluid flow guide.

A device and method for magnetic tissue support is disclosed in U.S. Pat. No. 8,398,703 wherein a metallic component and magnetic component used to allow to interact through body tissue so as to provide external support of the tissue.

A magnetic stent is illustrated in U.S. Pat. No. 6,673,104 as an implantable medical device for intralumenal support of a body lumen where a portion of the device is comprised of a magnetic material.

Finally, a movable magnetic for magnetically guided catheters is disclosed in U.S. Pat. No. 8,532,743 having flexible tubing with a movable magnet in the proximal end and a movable magnet repositioned to an internal magnet fluid to position the guide and distal end of the flexible tubing.

SUMMARY OF THE INVENTION

A method and device to assist in guiding an ablation laser for targeted fenestration within an implanted vascular endoprosthesis for endovascular aneurysm repair by providing a magnetically enable guide sheath with a magnetic enabled arterial stent in the proximal end of the supply artery for magnetic attraction and alignment of the guide sheath through the vascular endoprosthesis stent wall. The so-aligned magnetic sheath helps deploy the laser for precise access aperture formation in the vascular endoprosthesis stent graft assuring precise alignment into the target artery for the subsequent placement of the covered stent.

DETAILED DESCRIPTION OF THE INVENTION

Figure 1:
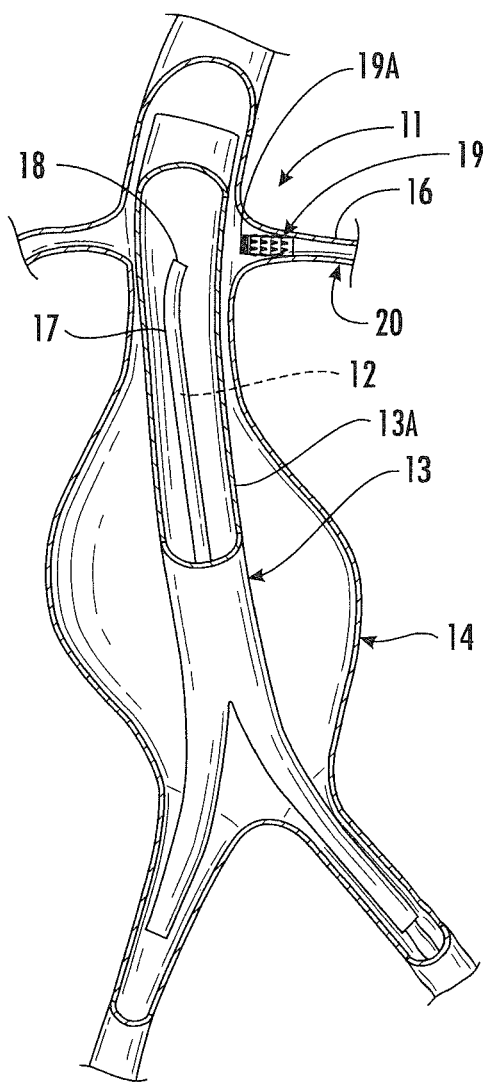
FIG. 1 is a graphic sectional view of an aortic aneurysm with an endovascular stent graft in place and the magnetic guided sheath prior to magnetic attraction with a placed magnetic arterial stent.
Figure 2:
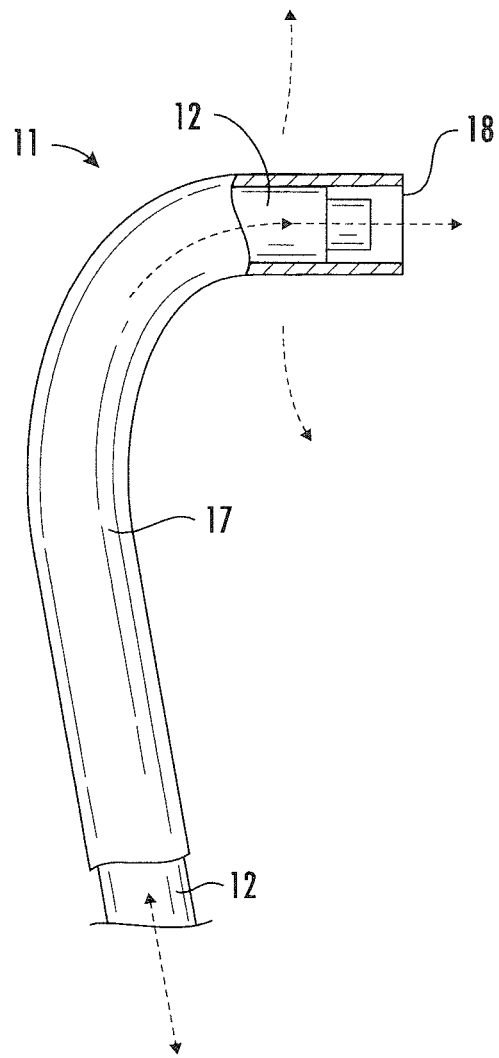
FIG. 2 is an enlarged side elevational view with portions broken away of the magnetic guide sheath with the laser.
Figure 3:
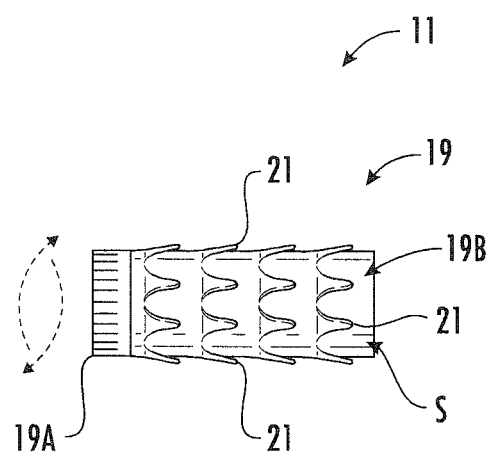
FIG. 3 is an enlarged side elevational view of the target stent with magnetic end portion and directional retainment barbs there about.

Referring to FIGS. 1-3 of the drawings, a surgical method and apparatus assembly 11 of the invention for remote guidance and alignment to assist in the placement of the ablation laser 12 within an endovascular stent graft 13 placed intraluminally for repair in an aortic aneurysm 14 can be seen. The critical difficulty in such endovascular procedures is to provide access opening in the vascular prothesis endograft wall 15 in alignment with, in this example, a renal artery 16 is compounded by the limited two-dimensional imagery typically afforded by angiogram, not shown, for this type of procedure.

Figure 4:
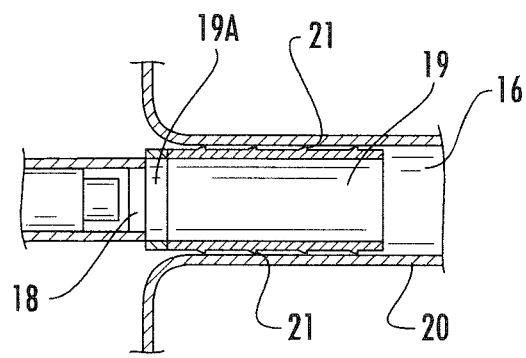
FIG. 4 is an enlarged partial sectional view of the magnetic guide sheath and laser positioned for ablation of the endovascular stent graft wall during targeted fenestration.

The surgical method of the invention provides precise magnetic guidance for subsequent use of the ablation laser 12 by a guide sheath 17 within which the ablation laser 12 is tracked. The guide sheath 17 having a manipulative elongated configuration with integral magnetic end portion 18 of a geometry to enable its directed magnetic pole properties with a ring configuration, in this example, as best seen in FIGS. 2 and 3 of the drawings. The magnetic end portion 18 may be additive or of integral magnetic or magnetized material suitable for surgical applications as will be well understood by those skilled in the art. The surgical method of the invention requires a magnetic target to attract the guide sheath 17 which in this application is used as a target stent 19 of the apparatus assembly 11, best seen in FIGS. 3 and 4 of the drawings. The target stent 19 having the primary properties of a traditional stent for implantation in a blood vessel, usually arteries, known as vascular stents which are cylindrical and expand radially once positioned within the arteries. The target stent 19 of the invention may be of any expanding configuration and has, in this example, a magnetic end portion 19A which may be integral to its construction or additive so as to have a strong magnetism with a directed magnetic pole.

The integration and placement therefore of the magnetic end portion 19A will be compliant with the radial expansion properties of the stent and may therefore be segmented as an example so illustrated on the expanding body 19B of the stent as hereinbefore described.

The procedural aspects of the surgical technique of the invention therefore require placement of the magnetic enabled target stent 19 directly in a target artery 20 which in this example may be the renal artery along the abdominal aorta wherein such juxta renal aneurysms, as noted, are difficult to repair due to the complexities of the anatomy and the difficulty therefore of locating the orifice of the target vessel once the aortic stent graft 13 has been deployed. The target stent 19 is so positioned by standard catheter deployment techniques so as to be within the target vessel and flush to the aortic wall and the endovascular stent graft 13. The target stent 19 is oriented with the magnetic enabled end portion 19A towards the endovascular stent graft 13 or the proximal end of the target vessel 19, in this example, having a plurality of directional stabilization barbs 21 formed circumferentially on the stent's outer surface S so as to engage within the artery's interior wall 20A. This orientation and retainment will prevent longitudinal movement of the target stent 19 which may occur during the endovascular procedure due to the magnetic attraction and engagement as will be described in detail hereinafter.

The positional placement of the endovascular stent graft 13 is by traditional endovascular methods using a delivery system inserted into an artery and then positioned within the aorta aneurysm 14 and released from the delivery system and expanded in place.

Figure 5:
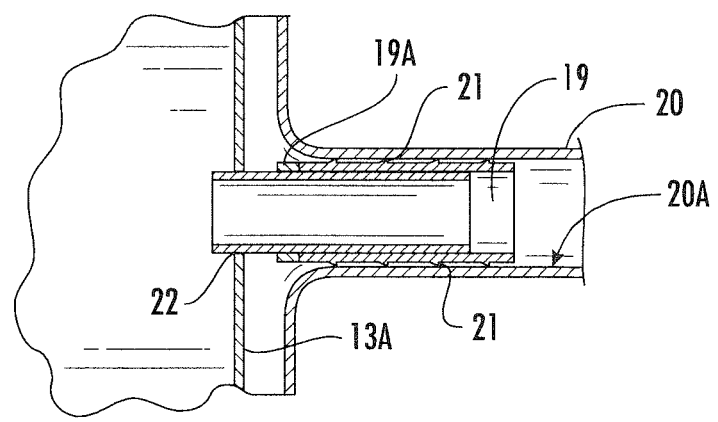
FIG. 5 is an enlarged partial sectional view of the target stent in retained position in the graft wall.

Correspondingly, the ablation laser 12 and guide sheath 17 may use the catheter placement method, not shown, for introduction into the endovascular graft 13, as noted. The inclusion of magnetic enabled guide sheath 17 will assist in the subsequent alignment of the ablation laser 12 against the endovascular stent graft wall 13A by magnetic attraction to the already positioned magnetic target stent 19 within the target artery 20 as hereinbefore described. The ablation laser 12 is used to create a fenestration at 21 in the endovascular stent graft wall 13A in alignment with the target stent 19 that subsequently allows for a cover stent 22 to be secured from the endovascular graph opening at 22 into the target stent 19 as will be well understood by those skilled in the surgical art as best seen in FIG. 5 of the drawings.

It will thus be seen that a new and novel endovascular method 10 and apparatus assembly 11 for remote guidance and alignment for precise laser fenestration 21 has been illustrated and described and it will be apparent to those skilled in the art that various changes and modifications may be made thereto without departing from the spirit of the invention.

Therefore I claim:

1. A method to help precise alignment of an ablation laser within an aortic endovascular stent graft in an aortic aneurysm comprising, deploying a magnetic target stent in an aortic branch target artery defining an end magnetic pole, providing a flexible magnetic guide sheath for insertion of the ablation laser, defining a magnetic pole on the free end of said guide sheath, introducing said magnetic sheath and ablation laser into the endovascular stent graft, repositioning the ablation laser in response to magnetic attraction between the respective end magnetic poles of the magnetic guide sheath and magnetic target stent, tracking the ablation laser from said magnetic guide sheath, forming an opening by the ablation laser in the endovascular stent graph in alignment with the magnetic target stent, removing the ablation laser after creation of the fenestration, placing a cover stent through the said endovascular stent graft fenestration into the magnetic target stent, defining a fluid communication between the endovascular stent graft and the aortic branch target artery.

\* \* \* \* \*